US012120384B2

(12) United States Patent
Mathews et al.

(10) Patent No.: US 12,120,384 B2
(45) Date of Patent: Oct. 15, 2024

(54) METHODS AND APPARATUS TO IMPROVE DEEPFAKE DETECTION WITH EXPLAINABILITY

(71) Applicant: McAfee, LLC, Santa Clara, CA (US)

(72) Inventors: Sherin M. Mathews, Santa Clara, CA (US); Shivangee Trivedi, Plano, TX (US); Amanda House, Plano, TX (US); Celeste R. Fralick, Plano, TX (US); Steve Povolny, Hillsboro, OR (US); Steve Grobman, Plano, TX (US)

(73) Assignee: MCAFEE, LLC, San Jose, CA (US)

( * ) Notice: Subject to any disclaimer, the term of this patent is extended or adjusted under 35 U.S.C. 154(b) by 720 days.

(21) Appl. No.: 16/586,885

(22) Filed: Sep. 27, 2019

(65) Prior Publication Data

US 2021/0097382 A1    Apr. 1, 2021

(51) Int. Cl.
*H04N 21/44* (2011.01)
*G06F 16/41* (2019.01)
(Continued)

(52) U.S. Cl.
CPC ....... *H04N 21/44008* (2013.01); *G06F 16/41* (2019.01); *G06N 3/04* (2013.01); *G06N 3/08* (2013.01); *G06V 10/764* (2022.01); *G06V 10/7788* (2022.01); *G06V 10/7796* (2022.01); *G06V 10/82* (2022.01); *G06V 20/00* (2022.01); *G06N 5/045* (2013.01)

(58) Field of Classification Search
CPC .......... G06N 3/08; G06N 3/04; G06N 3/0454; G06N 5/045; G06F 16/41; G06K 9/6254; G06K 9/6265; G06K 9/6271; G06V 10/82; G06V 20/00; H04N 21/44008
See application file for complete search history.

(56) References Cited

U.S. PATENT DOCUMENTS 10,719,301 B1 *  7/2020  Dasgupta ............. G06V 10/774
10,860,836 B1 * 12/2020  Tyagi .................... G06N 3/084
(Continued)

OTHER PUBLICATIONS

Koene et al, "A governance framework for algorithmic accountability and transparency", Apr. 2019, EPRS (Year: 2019).*
(Continued)

*Primary Examiner* — YuJang Tswei
(74) *Attorney, Agent, or Firm* — Hanley, Flight & Zimmerman, LLC

(57) ABSTRACT

Methods, apparatus, systems and articles of manufacture to improve deepfake detection with explainability are disclosed. An example apparatus includes a deepfake classification model trainer to train a classification model based on a first portion of a dataset of media with known classification information, the classification model to output a classification for input media from a second portion of the dataset of media with known classification information; an explainability map generator to generate an explainability map based on the output of the classification model; a classification analyzer to compare the classification of the input media from the classification model with a known classification of the input media to determine if a misclassification occurred; and a model modifier to, when the misclassification occurred, modify the classification model based on the explainability map.

16 Claims, 9 Drawing Sheets

(51) Int. Cl.

| | |
|---|---|
| *G06N 3/04* | (2023.01) |
| *G06N 3/08* | (2023.01) |
| *G06N 5/045* | (2023.01) |
| *G06V 10/764* | (2022.01) |
| *G06V 10/778* | (2022.01) |
| *G06V 10/82* | (2022.01) |
| *G06V 20/00* | (2022.01) |

(56) References Cited

U.S. PATENT DOCUMENTS

| | | | | |
|---|---|---|---|---|
| 10,909,349 | B1* | 2/2021 | Tripathi | G06T 19/00 |
| 11,106,903 | B1* | 8/2021 | Huynh | G06V 10/82 |
| 11,537,506 | B1* | 12/2022 | Dasgupta | G06F 11/1476 |
| 11,556,746 | B1* | 1/2023 | Dasgupta | G06F 18/24 |
| 2009/0318815 | A1* | 12/2009 | Barnes | A61B 5/0079 |
| | | | | 382/128 |
| 2010/0158319 | A1* | 6/2010 | Jung | G06V 40/40 |
| | | | | 382/218 |
| 2010/0241596 | A1* | 9/2010 | Lee | G06N 5/04 |
| | | | | 706/46 |
| 2017/0337711 | A1* | 11/2017 | Ratner | H04N 19/119 |
| 2017/0357847 | A1* | 12/2017 | Jabri | G06T 7/73 |
| 2019/0042894 | A1* | 2/2019 | Anderson | G06N 20/00 |
| 2019/0108384 | A1* | 4/2019 | Wang | G06F 18/214 |
| 2019/0114547 | A1* | 4/2019 | Jaganathan | G16B 50/00 |
| 2020/0076677 | A1* | 3/2020 | Mermoud | H04L 41/5009 |
| 2020/0092237 | A1* | 3/2020 | Sharifi | H04N 21/4394 |
| 2020/0265304 | A1* | 8/2020 | Nagaraj Chandrashekar | |
| | | | | G06N 20/00 |
| 2020/0349464 | A1* | 11/2020 | Lin | G06V 10/82 |
| 2020/0364864 | A1* | 11/2020 | Shanbhag | G06T 11/008 |
| 2021/0042529 | A1* | 2/2021 | Price | G06V 20/41 |
| 2021/0056709 | A1* | 2/2021 | Bagherinezhad | G06V 20/52 |
| 2021/0089895 | A1* | 3/2021 | Munoz Delgado | G06N 3/043 |
| 2021/0097176 | A1 | 4/2021 | Mathews et al. | |

OTHER PUBLICATIONS

Afchar et al., "MesoNet: a Compact Facial Video Forgery Detection Network", Sep. 4, 2018 (Year: 2018).*

Guera et al., "Deepfake Video Detection Using Recurrent Neural Networks", Feb. 14, 2019 (Year: 2019).*

Oguzhan Gencoglu et al., "HARK Side of Deep Learning—From Grad Student Descent to Automated Machine Learning", 2019, arxiv.org (Year: 2019).*

Guo et al, "LEMNA: Explaining Deep Learning based Security Applications", 2018, dl.acm.org (Year: 2018).*

Patro et al, "U-CAM: Visual Explanation using Uncertainty based Class Activation Maps", 2019, iitk.ac.in (Year: 2019).*

Selvaraju, Ramprasaath R. et al, "Grad-CAM: Visual Explanations from Deep Networks via Gradient-based Localization", 2017 IEEE International Conference on Computer Vision (ICCV), Oct. 22-29, 2017, 26 pages.

Afchar, Darius, et al., "MesoNet: a Compact Facial Video Forgery Detection Network", 2018 IEEE International Workshop on Information Forensics and Security (WIFS), Dec. 11-13, 2018, 9 pages.

Pomari, Thales, "Image Splicing Detection Through Illumination Inconsistencies and Deep Learning", published in 2018 25th IEEE International Conference on Image Processing (ICIP), Oct. 7-10, 2018, 3 pages.

Bronshtein, Adi, "Train/Test Split and Cross Validation in Python", retrieved from https://towardsdatascience.com/train-test-split-and-cross-validation-in-python-80b61beca4b6, posted May 17, 2017, 11 pages.

"Where CNN Is Looking?—Grad Cam", retrieved from https://www.hackevolve.com/where-cnn-is-looking-grad-cam/, posted Feb. 25, 2018, 8 pages.

International Searching Authority, "International Search Report and Written Opinion," issued in connection with PCT Application No. PCT/US2020/052067, mailed Dec. 3, 2020, 16 pages.

Chugh et al., "Not made for each other—Audio-Visual Dissonance-based Deepfake Detection and Localization," ARXIV.org, Association for Computing Machinery, published Jun. 3-5, 2018, Woodstock, NY, last revised Jun. 1, 2020, 9 pages.

Korshunov et al., "DeepFakes: a New Threat to Face Recognition? Assessment and Detection," ARXIV.org, Cornell University Library, 201 Olin Library Cornell University Ithaca, NY, Dec. 20, 2018, 5 pages.

Nguygen et al., "Deep Learning for Deepfakes Creation and Detection: A Survey," ARXIV.org, Cornell University Library, 201 Olin Library Cornell University Ithaca, NY, Sep. 25, 2019, 16 pages.

Samek et al., "Explainable Artificial Intelligence: Understanding, Visualizing and Interpreting Deep Learning Models," ARXIV.org, Aug. 28, 2017, 8 pages.

Ribeiro et al., "Why Should I Trust You?: Explaining the Predictions of Any Classifier," ARXIV.org, Cornell University Library, 201 Olin Library Cornell University Ithaca, NY, last revised Aug. 9, 2016, 10 pages.

International Searching Authority, "International Preliminary Report on Patentability," issued in connection with Application No. PCT/US2020/052067, issued Mar. 15, 2022, 10 pages.

* cited by examiner

METHODS AND APPARATUS TO IMPROVE DEEPFAKE DETECTION WITH EXPLAINABILITY

FIELD OF THE DISCLOSURE

This disclosure relates generally to artificial intelligence, and, more particularly, to methods and apparatus to improve deepfake detection with explainability.

BACKGROUND

A deepfake is media (e.g., an image, video, and/or audio) that was generated and/or modified using artificial intelligence. In some examples, a deepfake creator may combine and/or superimpose existing images and/or video onto a source image and/or video to generate the deepfake. As artificial intelligence (e.g., neural networks, deep learning, machine learning, and/or any other artificial intelligence technique) advances, deepfake media has become increasingly realistic and may be used to generate fake news, pranks, and/or fraud.

Figure 1:
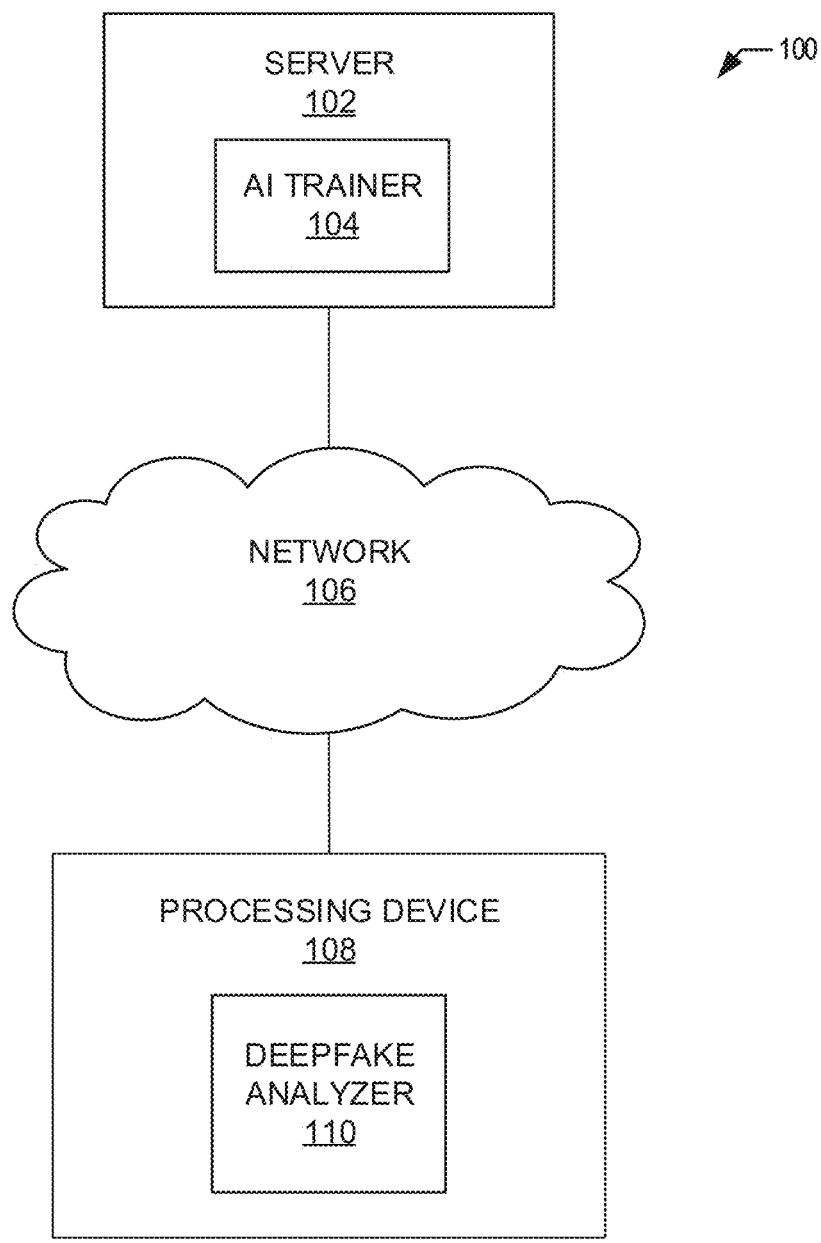
FIG. 1 illustrates an example where deepfake classification learning algorithms may be trained and/or deployed to an end user.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other. Stating that any part is in "contact" with another part means that there is no intermediate part between the two parts.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

As open source materials become prevalent, more people have access to a larger variety of tools to create more advanced software. As more advanced software is developed, the ability to use such software for malicious purposes increases. For example, the production of deepfakes has significantly increased. Deepfakes may be used to create fake videos of people (e.g., celebrities or politicians) that appear to misrepresent them by manipulating their identity, words, and/or actions. As artificial intelligence (AI) advances, deepfakes are becoming increasingly realistic. Being able to identify and detect deepfakes accurately is important, as deepfakes could be detrimental (e.g., fake emergency alerts, fake videos to destroy someone's reputation, or fake video and/or audio of politicians during an election).

Because deepfakes can be convincing, it is difficult and/or even impossible for humans to identify "real" (e.g., authentic) vs. "deepfake" media file. AI can be used to process and analyze a media file (e.g., an images and/or video file) to classify it as "real" or "deepfake." For example, a neural network (e.g., convolution neural network (CNN)) may be trained on known "real" and "deepfake" media files so that multiple layers of the CNN can be trained to analyze, identify and classify the media file is "real" or a "deepfake." This trained model can then be used to analyze, identify, and classify new and unknown media files as "real" or "deepfake".

Examples disclosed herein make use of an (AI) model that analyzes media files using their mesoscopic properties (e.g., low-level features). The AI model distinguishes between "real" and "deepfake" media by visualizing mesoscopic properties of a media file. The activations of neurons of the AI model differ when exposed to "real" content versus "deepfake" content, and this difference acts as the primary factor for distinguishing between "real" and "deepfake" content.

However, most AI systems operate as a black box (e.g., a device defined by inputs and outputs that performs an operation without anyone's knowledge of its internal workings). Accordingly, when a trained CNN obtains media files and generates a classification prediction, (e.g., "real" or "deepfake"), it is not apparent how the classification was made. In addition, tuning and/or retraining a CNN based on misclassifications (e.g., classifying a "real" image as a "deepfake") can be difficult because there is no understanding of what elements of an input caused the misclassification.

Explainability is a technique that provides understanding as to how an AI-assisted system/model generated an output. For example, if an AI-assisted system processes an image to generate an output (e.g., an answer to a question), explainability identifies the parts of the image that the AI-assisted system focused on to generate the output. Particularly, explainability can generate a heat map of an image that identifies important features of the image an AI model used to generate the output and come to a conclusion. Explainability may be implemented using gradient weighted class activation mapping (Grad-CAM), local interpretable model-agnostic explanations (LIME), and/or any other explainability technique.

Examples disclosed herein utilize explainability along with the deepfake classification. When a deepfake classification model classifies media files as "real" or "deepfake," explainability outputs a mapping to illustrate important features used by the model to perform classification. In this manner, examples use explainability to further understand and correct misclassifications generated by the deepfake classification model, thereby increasing the model's robustness along with increase trust in classifier predictions.

FIG. 1 illustrates a block diagram of an example environment 100 including an example server 102, an example AI trainer 104, an example network 106, an example processing device 108, and an example deepfake analyzer 110. Although the example environment 100 includes the deepfake analyzer 110 in the example processing device 108, the example deepfake analyzer 110 may additionally or alternatively be implemented in the example server 102, as further described below.

The example server 102 of FIG. 1 includes the example AI trainer 104. The AI trainer 104 trains the AI model based on a dataset of pre-classified media. For example, the AI trainer 104 may utilize 10,000 video frames that have already been correctly identified as "real" or "deepfake." The AI trainer 104 may utilize all or part of the dataset to train the AI model to learn to classify video frames based on the characteristics of the video frames and corresponding classification in the known data set. In some examples, the training of a deepfake classification model includes using a portion of the known dataset for training and a portion of the known dataset for testing the initially trained model. In this manner, the AI trainer 104 can use any misclassifications (e.g., false negatives or false positives) from the initially trained model to tune the initially trained model to avoid future misclassifications.

In some examples, the AI trainer 104 may receive explainability reports/mappings from the example deepfake analyzer 110. As further described below, the explainability report/mapping identifies features of media files that were responsible for the trained deepfake classification model to drive the decision that the model made. In some examples, the server 102 includes the deepfake analyzer 110 to generate explainability maps during training/testing of a classification model, as further described below. The AI trainer 104 may use the explainability report during testing/training to identify reasons for a misclassification. Additionally or alternatively, the AI trainer 104 may receive feedback (e.g., reports corresponding to classifications and corresponding explainability maps) from the example processing device 108 after the deepfake analyzer 110 has performed classifications locally using the deployed model. The AI trainer 104 may utilize the feedback and/or provide the feedback to a user to further tune the deepfake classification model, as further described below.

As described above, the AI trainer 104 of FIG. 1 may utilize a first portion of the dataset initially and utilize classification and/or misclassification of a second portion of the dataset to modify and/or otherwise tune the initial model to increase the accuracy of the model. In some examples, the AI trainer 104 may prompt a user to identify suggestions/instructions as to reasons for the misclassification. For example, the AI trainer 104 may include a user interface to display an explainability mapping of a misclassified image and/or frame and prompt the user to provide feedback as to a possible cause of the misclassification based on the explainability mapping. The example AI trainer 104 may process explainability mappings generated by the deepfake analyzer 110 during training to identify common characteristics of "real" and/or "deepfake" media. In some examples, when the AI trainer 104 receives information corresponding to misclassified media, the AI trainer 104 may determine how the media file was misclassified by comparing the explainability mapping of the misclassified media to the common characteristics of real and deepfake media. The example AI trainer 104 may use the determination of how the media file was misclassified to further tune/train the deepfake classification model.

Once the example AI trainer 104 trains a model, the AI trainer 104 deploys the model so that it can be implemented on another device (e.g., the example processing device 108). In some examples, a trained model corresponds to a set of weights that are applied to neurons in a CNN. If a model implemented the set of weights, the model will operate in the same manner as the trained model. Accordingly, the example AI trainer 104 can deploy the trained model by generating and transmitting data (e.g., data packets, instructions, an executable) that identifies how to weight the neurons of a CNN to implement the trained model. When the example processing device 108 receives the data/instructions/executable (e.g., the deployed model), the processing device 108 can execute the instructions to adjust the weights of the local model so that the local model implements the functionality of the trained classification model.

The example network 106 of FIG. 1 is a system of interconnected systems exchanging data. The example network 106 may be implemented using any type of public or private network such as, but not limited to, the Internet, a telephone network, a local area network (LAN), a cable network, and/or a wireless network. To enable communication via the network 106, the example processing device 108 and/or the server 102 includes a communication interface that enables a connection to an Ethernet, a digital subscriber line (DSL), a telephone line, a coaxial cable, or any wireless connection, etc.

The example processing device 108 of FIG. 1 is a device that receives instructions data and/or an executable corresponding to a deployed model. The deepfake analyzer 110 of the processing device 108 uses the instructions, data, and/or executable to implement the deployed model locally at the processing device 108. The example processing device 108 of FIG. 1 is a computer. Alternatively, the example processing device 108 may be a laptop, a tablet, a smart phone, a personal processor, a server, and/or any other type of processing device. In the example of FIG. 1, the example processing device 108 includes the example deepfake analyzer 110. Additionally or alternatively, the example deepfake analyzer 110 may be included in the example server 102.

The example deepfake analyzer 110 of FIG. 1 configures a local model (e.g., a neural network) to implement the deployed deepfake classification model (e.g., the received instructions that identify how to adjust the weights of a CNN to implement the trained classification model). Once the deployed deepfake classification model is implemented by the example deepfake analyzer 110, the deepfake analyzer 110 obtains an input media file and generates an output identifying whether the input media file is "real" or "deepfake." For example, the deepfake classification model may be a trained CNN that analyzes the mesoscopic properties of the media file and outputs a probability score (e.g., between 0 and 1 inclusive). In some such examples, if the score is between 0 and less than 0.5, the deepfake analyzer 110 classifies the media file as a deepfake and if the score is greater than or equal to 0.5 and 1, the deepfake analyzer 110 classifies the media file as real. Additionally, the example deepfake analyzer 110 includes explainability to analyze the classification of the deepfake analyzer 110 and provide a mapping of the most import features that the deepfake analyzer 110 used in generating the classification. The example deepfake analyzer 110 generates a report which includes the classification and the explainability mapping and transmits the report to the example AI trainer 104 at the server 102.

In some examples, the deepfake analyzer 110 of FIG. 1 may be implemented in the AI trainer 104. For example, the deepfake analyzer 110 may be utilized to provide feedback when classifying a media file as real or deepfake. In such an example, the server 102 may include a database (e.g., memory) including a training dataset of, for example, 1000 images and/or video frames. Some of the images are real (e.g., authentic) while others are deepfakes, the classifications (e.g., real vs. deepfake) are known to the AI trainer 104 prior to training. The example AI trainer 104 may initially train a deepfake classification model using, for example, 700 out of the total number of images and/or video frames. Once the initial training is complete, the trained deepfake classification model is implemented in the deepfake analyzer 110. Once implemented, for example, 100 of the remaining known images and/or video frames from the training dataset can be provided as an input to the initially trained model for testing. In this manner, the AI trainer 104 can compare the outputs of the initially trained model to the known classifications to identify misclassifications (e.g., when the output classification for the input media file does not match the known classification). The example deepfake analyzer 110 can provide information to a user or the AI trainer 104 to determine how/why the misclassifications occurred based on the explainability mapping. In this manner, the AI trainer 104 can tune the initially trained deepfake classification model based on the feedback (e.g., the explainability maps of any misclassified media). This process may continue any number of times (e.g., using any number of the 200, for example, remaining known image and/or video frames from the training dataset) to further tune the deepfake classification model before deploying to the example processing device 108.

In some examples, the server 102 of FIG. 1 deploys the deepfake analyzer 110 to the example processing device 108. For example, a user of the processing device 108 may download the deepfake analyzer 110 from the server 102. In another example, the server 102 may automatically deploy the deepfake analyzer 110 to the processing device 108 via the network 106 (e.g., as part of a software upgrade and/or software update). In this manner, the example processing device 108 can identify deepfakes locally after the server 102 has deployed the deepfake analyzer 110 to the processing device 108.

Figure 2:
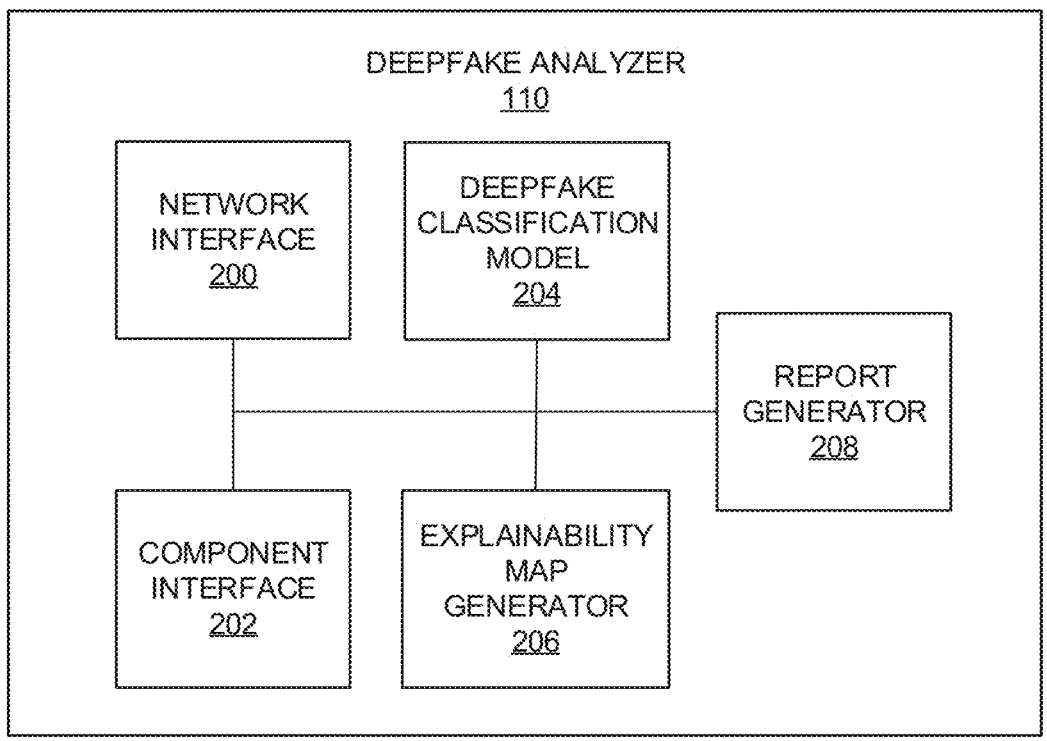
FIG. 2 is a block diagram of an example implementation of the deepfake analyzer of FIG. 1.

FIG. 2 is block diagram of an example implementation of the deepfake analyzer 110 of FIG. 1. The example deepfake analyzer 110 includes an example network interface 200, an example component interface 202, an example deepfake classification model 204, an example explainability map generator 206, and the example report generator 208.

The example network interface 200 of FIG. 2 transmits and/or receives data to/from the example AI trainer 104 via the example network 106 (e.g., when the deepfake analyzer 110 is implemented in the example processing device 108). For example, the network interface 200 may receive trained model data (e.g., instructions that identify a set of weights to apply to the neurons of a CNN to implement the trained model) from the example AI trainer 104. The trained model data corresponds to instructions to implement a deepfake classification model based on training that occurred at the AI trainer 104. Additionally, the network interface 200 may transmit reports to the example AI trainer 104. For example, when the example deepfake analyzer 110 classifies an obtained media file, the deepfake analyzer 110 may generate a report identifying or otherwise including the input media file, the classification (e.g., real/deepfake and/or the classification score), and/or the explainability map resulting from the classification. The example network interface 200 can transmit the report to the AI trainer 104 to provide feedback for subsequent training and/or modifying of the deepfake model.

The example component interface 202 of FIG. 2 transmits and/or receives data to/from other components of the example processing device 108 and/or the AI trainer 104 (e.g., when the deepfake analyzer 110 is implemented in the example server 102). For example, the component interface 202 may receive media files (e.g., images and/or video) that are stored in and/or received by the example processing device 108 for deepfake classification. When the example deepfake analyzer 110 is implemented in the example server 102, the component interface 202 may receive trained model data and provide feedback (e.g., reports) to the example AI trainer 104. In some examples, the component interface 202 may interface with storage and/or memory of the example processing device 108 and/or AI trainer 104 to store reports.

The example deepfake classification model 204 of FIG. 2 is a neural network (e.g., CNN). However, the deepfake classification model 204 may be a machine learning model, a deep learning model, another type of neural network, and/or any other type of model and/or network. Initially, the example deepfake classification model 204 is untrained (e.g., the neurons are not yet weighted). However, once the instructions are received from the example server, the neurons of the example deepfake classification model 204 are weighted to configure the deepfake classification model 204 to operate according to the trained deepfake classification model generated by the example AI trainer 104. Once trained, the example deepfake classification model 204 obtains an input media file (e.g., an images and/or a video frame) and performs a classification identifying whether the input media file is real or a deepfake based on the analysis of the mesoscopic properties of the input data using the trained model. The example AI trainer 104 generates a probability score (e.g., between 0 and 1 inclusive) that corresponds to whether the input media file is real or a deepfake. The example deepfake classification model 204 outputs the probability score for the input media file to the example report generator 208.

The example explainability map generator 206 of FIG. 2 analyzes the classification of the deepfake classification model for an input media file and generates an explainability map to identify the most important parts of the input media file used to generate the classification for the input media file. In the example deepfake analyzer 110 of FIG. 2, the explainability map generator 206 is implemented by Grad-CAM. However, in some examples, the explainability map generator may be implemented by LIME and/or another explainability technique. The explainability map generator 206 utilizes class-specific gradient information from the final convolution layer of the deepfake classification model 204 to generate a localization map (e.g., an explainability map) of the regions of the input media that were more important to the deepfake classification model 204 when generating the output classification of the input media file.

The example explainability map generator 206 of FIG. 2 can be tuned based on the known dataset used to train the AI model at the example AI trainer 104. For example, for image-based deepfake explainability, the explainability map generator 206 of FIG. 2 is tuned to 40 epochs, 250 training steps per epoch, 125 validation steps per epoch, and an 80:20 ratio of data divided into train:test. For video-based deepfake explainability, the explainability map generator 206 of FIG. 2 is tuned to 10 epochs, 3 training steps per epoch, and an 80:20 ratio of data divided into train:test. Epoch is an iteration over all of the training data. Steps per epoch is the number of batch iterations before a training epoch is considered finished. Validation steps per epoch is the number of batch interactions before a validation is considered finished. The train:test ratio corresponds to how much of the data set is used for training compared to how much of the data is used to test the trained model.

The example report generator 208 of FIG. 2 obtains the input media file, the probability score from the example deepfake classification model 204 corresponding to the input media file, and the explainability map from the explainability map generator 206. The report generator 208 determines whether (e.g., classifies) the input media file is "real" (e.g., authentic) or a "deepfake" based on the probability score. For example, if the probability score is between 0 and less than 0.5, the report generator 208 determines that the input media file is a deepfake and if the probability score is greater than or equal to 0.5 and a 1.0, the report generator 208 determines that the input media file is real. The example report generator 208 generates a report identifying and/or including the input media file, the classification, and/or the explainability map. The example report generator 208 instructs the network interface 200 and/or the component interface 202 to transmit the report to the example AI trainer 104. In some examples, the report generator 208 instructs the component interface 202 to interface with storage to store the report.

Figure 3:
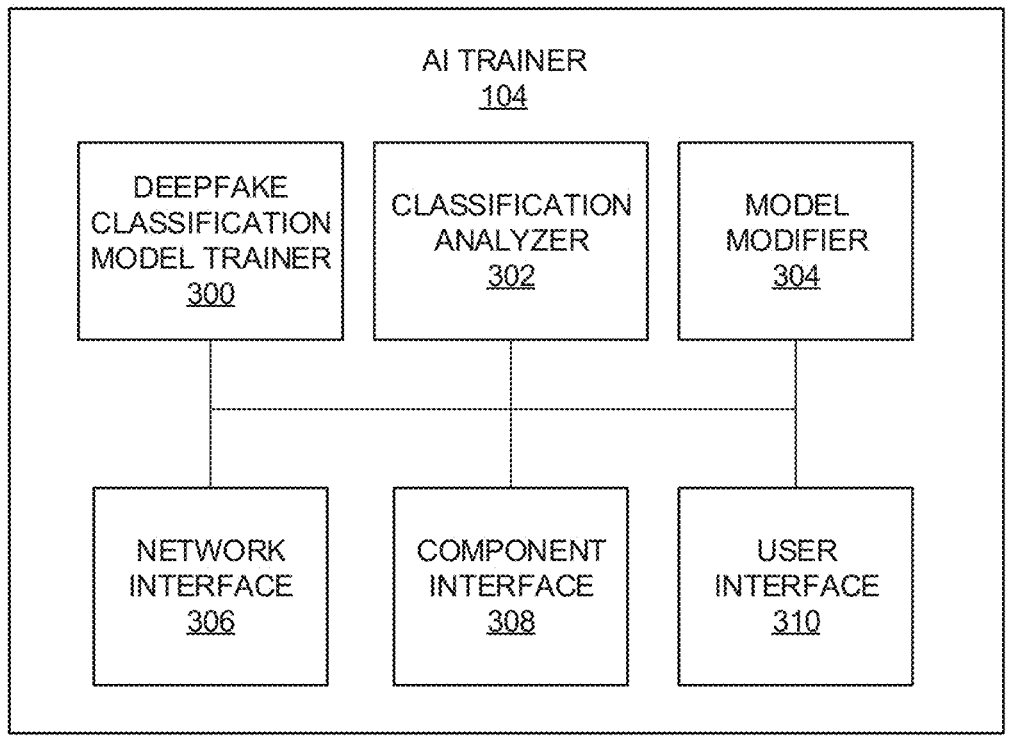
FIG. 3 is a block diagram of an example implementation of the artificial intelligence trainer of FIG. 1.

FIG. 3 is block diagram of an example implementation of the example AI trainer 104 of FIG. 1. The example AI trainer 104 includes an example deepfake classification model trainer 300, an example classification analyzer 302, an example model modifier 304, an example network interface 306, an example component interface 308, and an example user interface 310.

The example deepfake classification model trainer 300 of FIG. 3 generates a model (e.g., trains a neural network) based on a dataset of media files that has known classifications (e.g., known to be real or deepfake). The deepfake classification model trainer 300 trains based on the dataset to be able to classify subsequent media files as real or deepfake based on the characteristics of the known dataset used to train the deepfake classification model. In some examples, the deepfake classification model trainer 300 trains using a portion of the dataset. In this manner, the example deepfake analyzer 110 can use the remaining portion of the dataset to test the initially trained model to verify the accuracy of the initially trained model.

The example classification analyzer 302 of FIG. 3 analyzes the classifications of input media file from a trained deep-fake classification model during testing. For example, after an initial training of a deep-fake classification model, a portion of a dataset of media files with known classifications may be used to test the initially trained model. In such an example, the classification analyzer 302 may obtain the results of the classification of a particular media file of the dataset from the initially trained model and compare to the known classification of the particular media file to determine if the initially trained dataset misclassified the media file. If the classification analyzer 302 determines that the media file has been misclassified (e.g., because the output classification for the media from the trained model does not match the known classification), the classification analyzer 302 determines why the media file has been misclassified based on the explainability map corresponding to the misclassified media file.

In some examples, the classification analyzer 302 transmits a prompt to a user, administrator, and/or security researcher (e.g., via the user interface 310) to have the user, administrator, and/or security researcher diagnose possible reasons for a misclassification. In this manner, the user, administrator, and/or security researcher can instruct the model modifier 304 to tune or otherwise adjust the model based on the reasons for the misclassification. In some examples, the classification analyzer 302 automatically determines possible reasons for the misclassification. For example, the classification analyzer 302 may process explainability maps for correctly classification from the dataset to identify patterns of correctly classified real and/or deepfake media file. In this manner, the classification analyzer 302 may determine why misclassification occurred by comparing the explainability map of the misclassified media file to patterns of correctly classified explainability maps.

The example model modifier 304 of FIG. 3 modifies (e.g., tunes or adjusts) the deepfake classification model based on the reasons for a misclassification. For example, if the reasons for misclassification were due to the deepfake classification model using particular parts of an image that are deemed unimportant by the classification analyzer 302, a user, and/or an administrator, the model modifier 304 adjusts the weights of the deepfake classification model to deemphasize the unimportant parts. In some examples, the model modifier 304 may adjust a deepfake classification model based on results from deployed models. For example, if a deepfake classification model is deployed to the deepfake analyzer 110 in the processing device 108, the deepfake analyzer 110 may transmit reports to the example AI trainer 104. In such an example, the model modifier 304 may process the reports to determine if there are any deviations from the obtained explainability maps in the reports to the explainability maps generated during training. If there are deviations, the model modifier 304 may adjust the deepfake classification based on the deviation.

The example network interface 306 of FIG. 3 transmits and/or receives data to/from the example deepfake analyzer 110 via the example network 106 (e.g., when the deepfake analyzer 110 is implemented in the example processing device 108). For example, the network interface 306 may transmit trained model data (e.g., instructions that includes a set of weights to apply to the neurons of a CNN to implement the trained model) to the example device processor 108. Additionally, the network interface 306 may receive reports to the example deepfake analyzer 110.

The example component interface 308 of FIG. 3 transmits and/or receives data to/from the example deepfake analyzer 110 (e.g., when the deepfake analyzer 110 is implemented in the example server 102). For example, the component interface 308 transmits trained models to the example deepfake analyzer 110 and receives reports from the example deepfake analyzer 110.

The example user interface 310 of FIG. 3 interfaces with a user, administrator, and/or security researcher to display a prompt an showing input media file, corresponding classification information, and/or corresponding explainability maps. In this manner, the example user, administrator, and/or security researcher and interface with the user interface 310 to provide reasoning for why an image was misclassified.

While an example manner of implementing the example AI trainer 104 and/or the example deepfake analyzer 110 of FIG. 1 is illustrated in FIGS. 2 and/or 3, one or more of the elements, processes and/or devices illustrated in FIGS. 1, 2 and/or 3 may be combined, divided, re-arranged, omitted, eliminated and/or implemented in any other way. Further, the example network interface 200, the example component interface 202, the example deepfake classification model 204, the example explainability map generator 206, the example report generator 208, and/or, more generally, the example deepfake analyzer 110 of FIG. 1, and/or the example deepfake classification model trainer 300, the example classification analyzer 302, the example model modifier 304, the example network interface 306, the example component interface 308, user interface 310, and/or, more generally the example AI trainer 104 may be implemented by hardware, software, firmware and/or any combination of hardware, software and/or firmware. Thus, for example, any of the example network interface 200, the example component interface 202, the example deepfake classification model 204, the example explainability map generator 206, the example report generator 208, and/or, more generally, the example deepfake analyzer 110 of FIG. 1, and/or the example deepfake classification model trainer 300, the example classification analyzer 302, the example model modifier 304, the example network interface 306, the example component interface 308, user interface 310, and/or, more generally the example AI trainer 104 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example network interface 200, the example component interface 202, the example deepfake classification model 204, the example explainability map generator 206, the example report generator 208, and/or, more generally, the example deepfake analyzer 110 of FIG. 1, and/or the example deepfake classification model trainer 300, the example classification analyzer 302, the example model modifier 304, the example network interface 306, the example component interface 308, user interface 310, and/or, more generally the example AI trainer 104 is/are hereby expressly defined to include a non-transitory computer readable storage device or storage disk such as a memory, a digital versatile disk (DVD), a compact disk (CD), a Blu-ray disk, etc. including the software and/or firmware. Further still, the example AI trainer 104 and/or the example deepfake analyzer 110 of FIG. 1 may include one or more elements, processes and/or devices in addition to, or instead of, those illustrated in FIGS. 1, 2, and/or 3, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
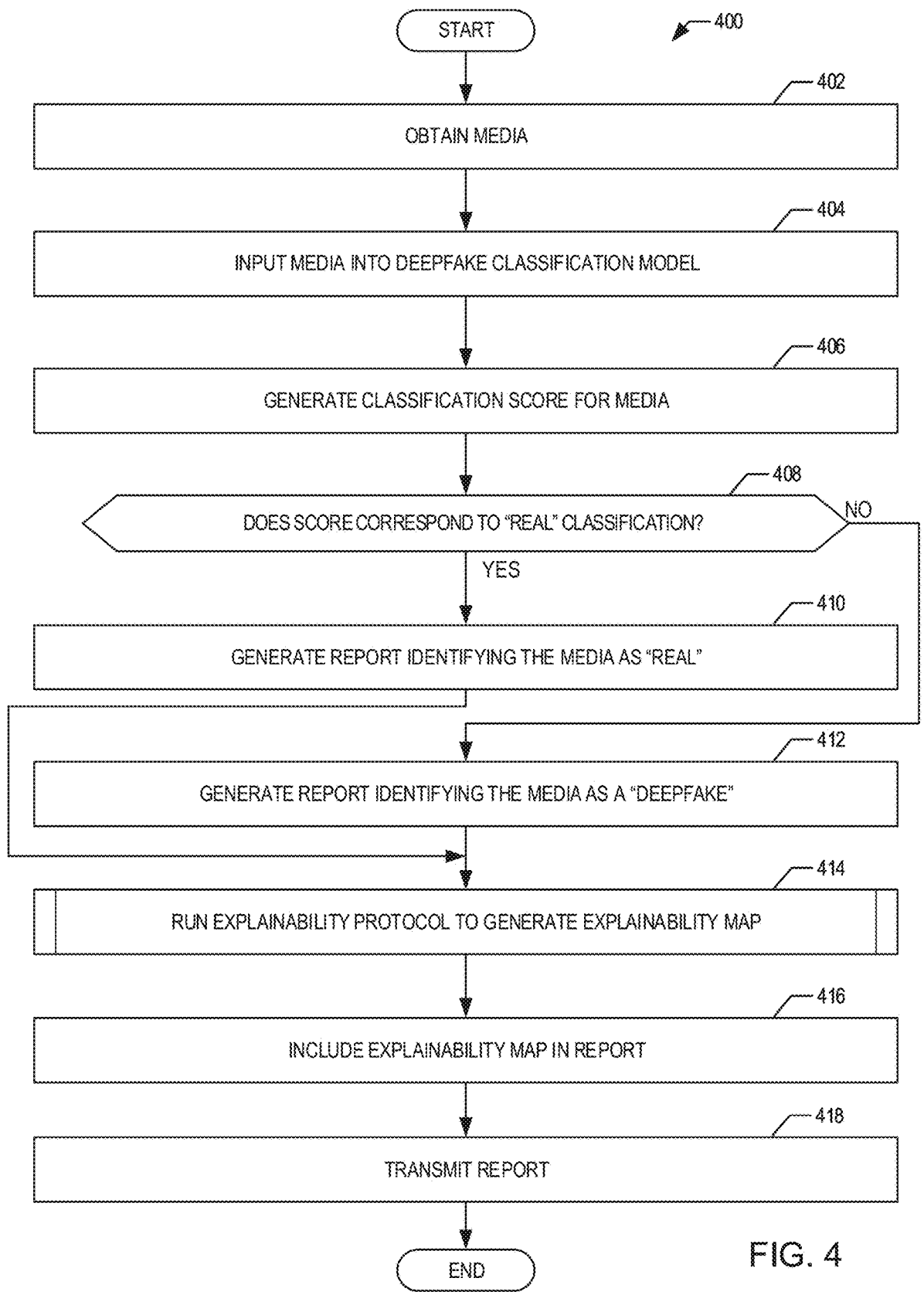
FIGS. 4-5 are flowcharts representative of machine readable instructions which may be executed to implement the example deepfake analyzer of FIGS. 1 and/or 2 to generate a report including explainability for a deepfake classification.
Figure 5:
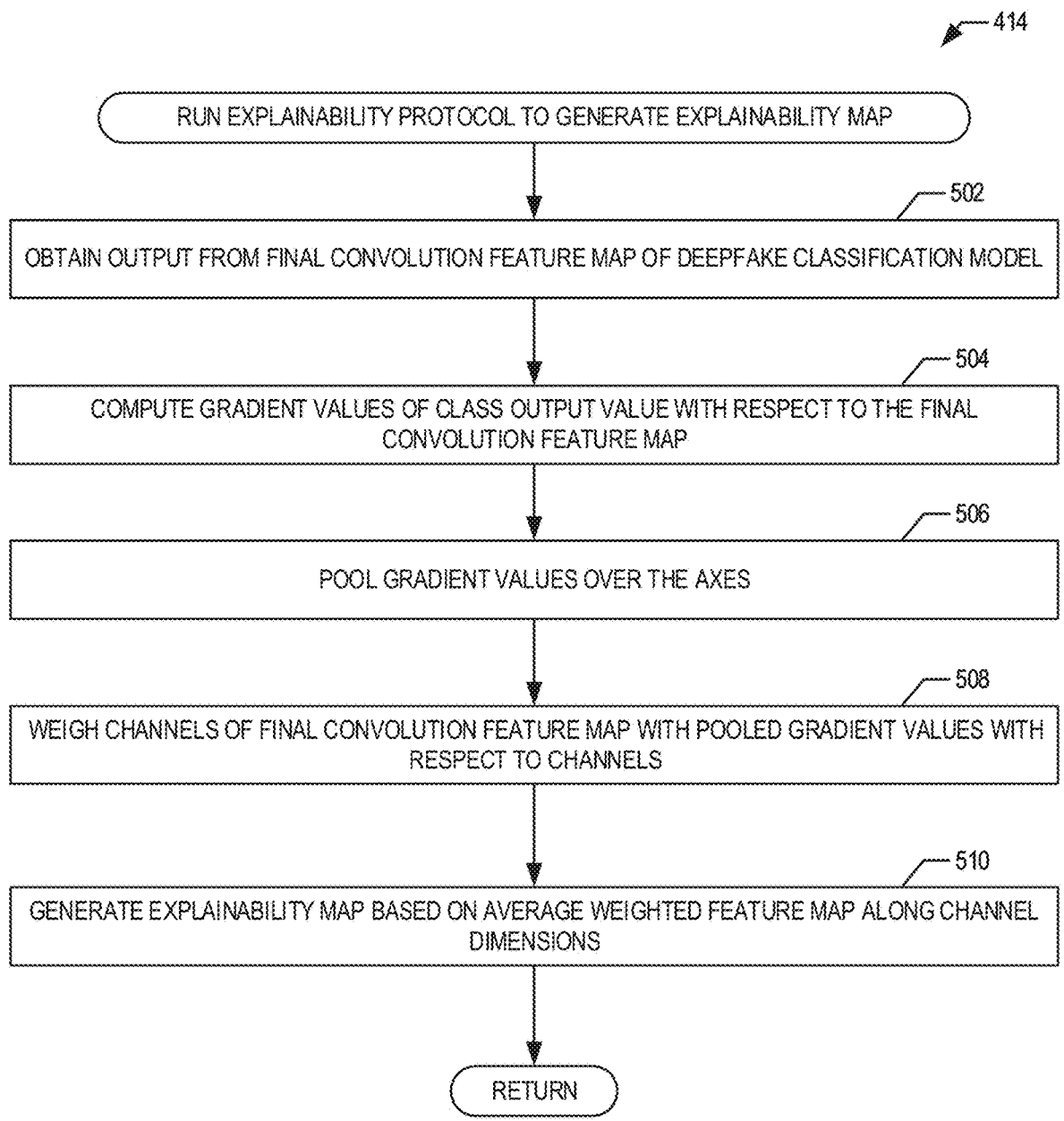
Figure 6:
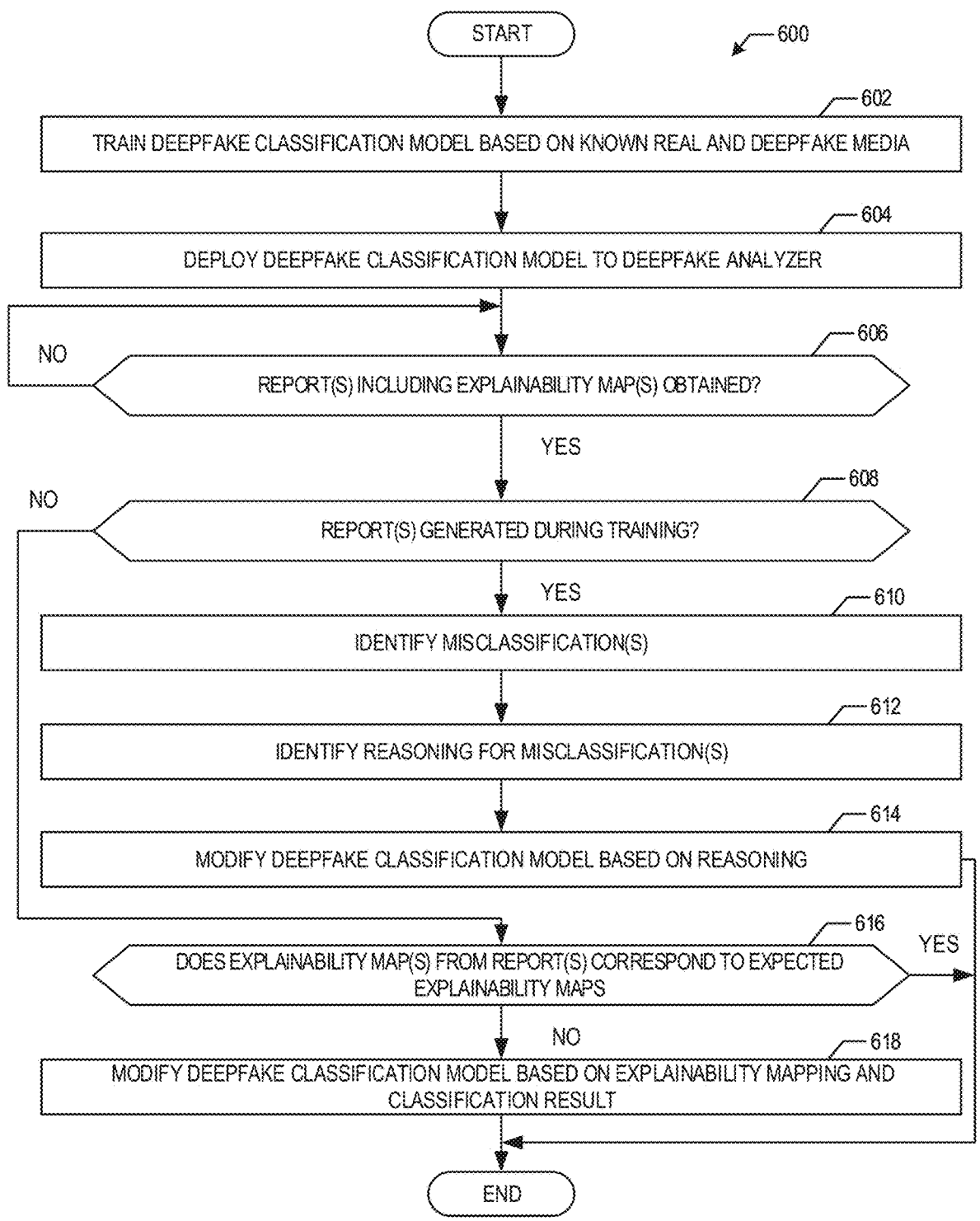
FIG. 6 is a flowchart representative of machine readable instructions which may be executed to implement the example artificial intelligence trainer of FIGS. 1 and/or 3 to train and/or modify a deepfake classification models.

Flowcharts representative of example hardware logic, machine readable instructions, hardware implemented state machines, and/or any combination thereof for implementing the example AI trainer 104 and/or the example deepfake analyzer 110 of FIGS. 1, 2, and/or 3 are shown in FIGS. 4-6. The machine readable instructions may be one or more executable programs or portion(s) of an executable program for execution by a computer processor such as the processor 812, 912 shown in the example processor platform 800, 900 discussed below in connection with FIGS. 8 and/or 9. The program may be embodied in software stored on a non-transitory computer readable storage medium such as a CD-ROM, a floppy disk, a hard drive, a DVD, a Blu-ray disk, or a memory associated with the processor 812, 912, but the entire program and/or parts thereof could alternatively be executed by a device other than the processor 812, 912 and/or embodied in firmware or dedicated hardware. Further, although the example program is described with reference to the flowcharts illustrated in FIGS. 4-6 many other methods of implementing the example AI trainer 104 and/or the example deepfake analyzer 110 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware.

The machine readable instructions described herein may be stored in one or more of a compressed format, an encrypted format, a fragmented format, a compiled format, an executable format, a packaged format, etc. Machine readable instructions as described herein may be stored as data (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement a program such as that described herein.

In another example, the machine readable instructions may be stored in a state in which they may be read by a computer, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, the disclosed machine readable instructions and/or corresponding program(s) are intended to encompass such machine readable instructions and/or program(s) regardless of the particular format or state of the machine readable instructions and/or program(s) when stored or otherwise at rest or in transit.

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4-6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is an example flowchart representative of machine readable instructions 400 that may be executed to implement the example deepfake analyzer 110 of FIG. 2 to classify a media file as real/real or as a deepfake and provide explainability for how the classification was reached. The example instructions may be used to implement the example deepfake analyzer 110 after a trained deepfake classification model has been deployed (e.g., from the example AI trainer 104) and implemented by the example deepfake classification model 204. Although the instructions 400 are described in conjunction with the example deepfake analyzer 110 of FIG. 2, the instructions 400 may be described in conjunction with any type of deepfake analyzer.

At block 402, the example component interface 202 obtains a media file from the example AI trainer 104 (e.g., a media file from a training dataset during testing) or from the processing device 108 (e.g., after the deepfake classification model has been deployed). In some examples (e.g., after the deepfake classification model has been deployed), the media file may be an image and/or video that has been downloaded, streamed, and/or otherwise obtained or displayed at the processing device 108.

At block 404, the example network interface 200 and/or the example component interface 202 inputs the media file into the example deepfake classification model 204. As described above, the example deepfake classification model 204 implements a trained model that the example AI trainer 104 deployed. The operation of the deepfake classification model 204 is further described above in conjunction with FIG. 2. At block 406, the example the example deepfake classification model 204 generates a classification score for the input media file. The classification score is a probability corresponding to whether the media file is real or a deepfake based on dataset of known real and deepfakes used to train the deepfake classification model 204.

At block 408, the example report generator 208 determines if the score corresponds to a "real" (e.g., authentic) classification. As described above in conjunction with FIG. 2, the report generator 208 determines that the input media file is a real/authentic when the score is between greater than or equal to 0.5 and 1.0 and determines the media file is deepfake when the score is between 0.0 and less than 0.5. If the example report generator 208 determines that the score corresponds to a "real" classification (block 408: YES), the example report generator 208 generates a report identifying (e.g., classifying) the input media file as "real" or authentic (block 410). If the example report generator 208 determines that the score does not correspond to a "real" classification (block 408: YES), the example report generator 208 generates a report identifying (e.g., classifying) the input media file as a "deepfake" (block 412).

At block 414, the example explainability map generator 206 runs an explainability technique to generate an explainability map, as further described below in conjunction with FIG. 5. At block 416, the example report generator 208 includes the explainability map in the report (e.g., the report generated at block 410, 412). At block 418, the example network interface 200 and/or the example component interface 202 transmits the report. For example, the network interface 200 (e.g., when the deepfake analyzer 110 is implemented in the processing device 108) and/or the component interface 202 (e.g., when the deepfake analyzer 110 is implemented in the server 102) may transmit the report to the example AI trainer 104. Additionally or alternatively, the example component interface 202 may transmit the report to memory to be stored.

FIG. 5 is an example flowchart representative of machine readable instructions 414 that may be executed to implement the example deepfake analyzer 110 of FIG. 2 to run an explainability technique to generate an explainability map, as described above in conjunction with block 414 of FIG. 4. Although the instructions 414 may be used to implement the example deepfake analyzer 110 of FIG. 2, the instructions 414 may be described in conjunction with any type of deepfake analyzer. The example instructions 414 is described in conjunction with a Grad-CAM technique. Additionally or alternatively, the example explainability map generator 206 may generate an explainability map based on any other type of explainability technique (e.g., LIME). However, directly applying any explainability framework may not supply the optimize classification results. Accordingly, the example framework of the example explainability map generator 206 uses Grad-CAM.

At block 502, the example explainability map generator 206 obtains the output from the final convolution feature map where k is the channel axis and i and j are dimensions for the gradient) of the deepfake classification model 204. At block 504, the example explainability map generator 206 computes the gradient values of class output value ($y^c$) with respect to the final convolution feature map $$\left(\frac{\partial y^c}{\partial A_{ij}^k}\right).$$

At block 506, the example explainability map generator 206 pools (e.g., average) the gradient values over the axes (i, j, and k)

$$\left(\sum_i \sum_j \sum_k \frac{\partial y^c}{\partial A_{ij}^k} A_{ij}^k,\right.$$

where Σ is the pooling and average operation). At block 508, the example explainability map generator 206 weighs the channels of the final convolution feature map with the pooled gradient values with respect to the channels $$\left(\frac{1}{z}\sum_i \sum_j \sum_k \frac{\partial y^c}{\partial A_{ij}^k} A_{ij}^k,\right.$$

where Z is the final convolution feature map). At block 510, the example explainability map generator 206 generates the explainability map based on the average weighted feature map along the channel dimensions $$\left(S^c = \frac{1}{z}\sum_i \sum_j \sum_k \frac{\partial y^c}{\partial A_{ij}^k} A_{ij}^k,\right.$$

where $S^c$ is the explainability map).

FIG. 6 is an example flowchart representative of machine readable instructions 600 that may be executed to implement the example AI trainer 104 of FIG. 3 to train and modify/tune a deepfake classification model. Although the instruction 600 may be used to implement the example AI trainer 104 of FIG. 3, the instructions 600 may be described in conjunction with any type of AI training server.

At block 602, the example deepfake classification model trainer 300 trains the deepfake classification model based on known real (e.g., authentic) and deepfake media (e.g., a dataset of known media files that is correctly classified). In some examples, the deepfake classification model trainer 300 trains the deepfake classification model based on a portion of the known real and deepfake media, reserving other portion(s) of the dataset to test the initially trained model to further tune and/or modify the model to be more accurate prior to deploying.

At block 604, the example network interface 306 and/or the example component interface 308 deploys the deepfake classification model to the deepfake analyzer 110. For example, the network interface 306 may deploy instructions, data, and/or an executable identifying how to adjust the weights of a neural network to implement the trained deepfake classification model to the example processing device 108 (e.g., via the example network 106) after the deepfake classification model has been trained. In another example, the component interface 308 may transmit a partially trained deepfake classification model (e.g., with a portion of the dataset of known classifications) to the deepfake analyzer 110 implemented at the server 102. In this manner, the example deepfake analyzer 110 can use a second portion of the dataset to test the accuracy of the partially trained deepfake classification model.

At block 606, the example network interface 306 (e.g., if the deepfake classification model was deployed to the deepfake analyzer 110 at the processing device 108 after training) and/or the example component interface 308 (e.g., if the deepfake classification model was deployed to the deepfake analyzer 110 at the server during training/testing) determines if one or more reports including explainability map(s) have been obtained. If the example network interface 306 and/or the example component interface 308 have not obtained a report including an explainability map (block 606: NO), control returns to block 606 until a report has been obtained. If the example network interface 306 and/or the example component interface 308 has obtained a report including an explainability map (block 606: YES), the example classification analyzer 302 determines if the report(s) were generated during training (block 608).

As described above in conjunction with FIG. 3, during training/testing, the example AI trainer 104 may initially train the deepfake classification model with a portion of the dataset of known classifications, deploy the initially trained model to the deepfake analyzer 110. In this manner, the deepfake analyzer 110 can implement the initially trained model and input a second portion of the dataset of known classifications to generate classifications for the second portion of the dataset. The example classification analyzer 302 can then compare the known classifications for the input media file to the classification from the initially trained model for the input media file to identify misclassification and tune the initially trained model based on information corresponding to the misclassifications. The process of testing may occur any number of times (e.g., with additional portions of the known dataset that have not been used to train the deepfake classification model) to tune the deepfake classification model to a desired accuracy.

If the example classification analyzer 302 determines that the report(s) was/were generated during training (block 608: YES), the example classification analyzer 302 identifies any misclassifications (block 610). For example, the classification analyzer 302 compares the known classifications of the dataset to the resulting classifications after being input into the deepfake classification model. If the known classification of a particular media file from the dataset does not match the classification output of the deepfake classification model, the classification analyzer 302 flags the media file as being misclassified.

At block 612, the example classification analyzer 302 identifies the reasoning for the misclassification(s). For example, the classification analyzer 302 may compare the explainability map of the misclassified media file to the explainability maps of the correctly classified media file. The example classification analyzer 302 looks for particular patterns in the explainability map of the misclassified media file that are the same as and/or differ from the explainability maps of correctly classified media file. In some examples, the classification analyzer 302 transmits a prompt to a user and/or security researcher administrator via the example user interface 310. In this manner, the user, administrator, and/or security researcher can identify reasoning for the misclassification. The example classification analyzer 302 determines the reasoning for misclassification(s) based on the feedback from the user, administrator, and/or security researcher. The prompt may include the misclassified media file, misclassification information, the explainability map for the misclassified media file, and/or a number of correctly classified media file (e.g., for comparison purposes).

At block 614, the example model modifier 304 modifies the deepfake classification model based on the reasoning for the misclassification(s). For example, if the reason for misclassification corresponds to the deepfake classification model focusing on a particular feature of the input media file that it should not have focused on or not focusing on a particular feature of the input media file that it should have focused on, the example model modifier 304 modifies the deepfake classification model (e.g., adjusts the weights to the neurons) to emphasis or deemphasize such portions in subsequent classifications.

If the example classification analyzer 302 determines that the report(s) was/were not generated during training (block 608: NO), the example classification analyzer 302 determines if the explainability maps correspond to expected explainability maps (block 610). For example, the classification analyzer 302 may compare the patterns of the explainability map(s) from the report(s) to previously explainability maps (e.g., from the testing portion of training) of the same classification. In this manner, the example classification analyzer 302 may flag any media files that have explainability maps that differ from the expected explainability map (e.g., historical explainability maps from the testing portion of training) for like media files of the same classification. If the example classification analyzer 302 determines that the explainability maps(s) from the report correspond to expected explainability maps (block 616: YES), control ends. If the example classification analyzer 302 determines that the explainability maps(s) from the report does not correspond to expected explainability maps (block 616: NO), the example model modifier 304 modifies the deepfake classification model based on the how the explainability map differs from the expected explainability maps (block 618).

Figure 7:
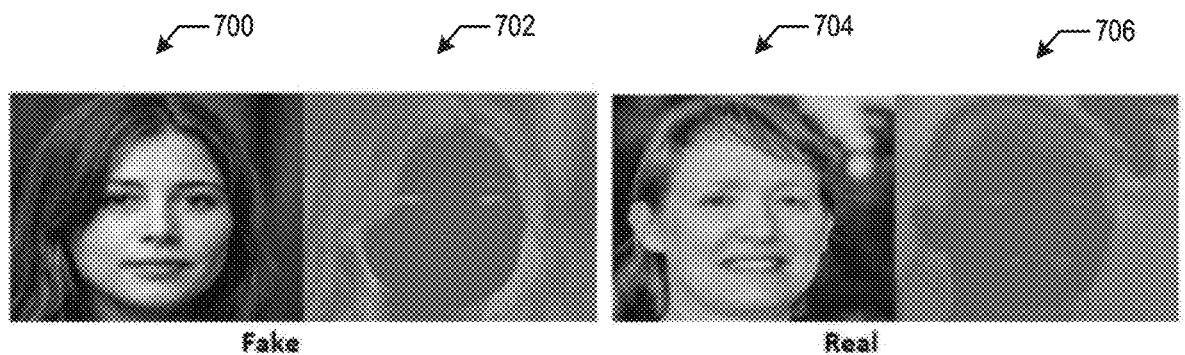
FIG. 7 illustrates example explainability maps that may be output by the example deepfake analyzer of FIGS. 1 and/or 2.

FIG. 7 illustrates example input images 700, 704 and corresponding example explainability maps 702, 706. The example input image 700 is a deepfake and the example input image 704 is a "real" image. As shown in the example explainability maps 702, 706, the trained neural network that classified the images 700, 704 focused on different facial features when classifying the images 700, 704 as real (e.g., authentic) or deepfake. For example, the trained neural network focused on the hair and eyes when classifying the example image 700 as a deepfake (e.g., as shown in the example explainability map 702). In some examples, the trained neural network focused on the hair, eyes, nose, mouth, and background when classifying the example image 704 (e.g., as shown in the example explainability map 706) for classification of real/authentic images and picks cues from the background for deepfakes. Accordingly, if the example images 700, 704 were used for testing the neural network and either of the example images 700, 704 were misclassified, the example Ai trainer 104 can utilize the explainability maps 702, 706 to identify the reasons for the misclassification and modify the neural network accordingly.

Figure 8:
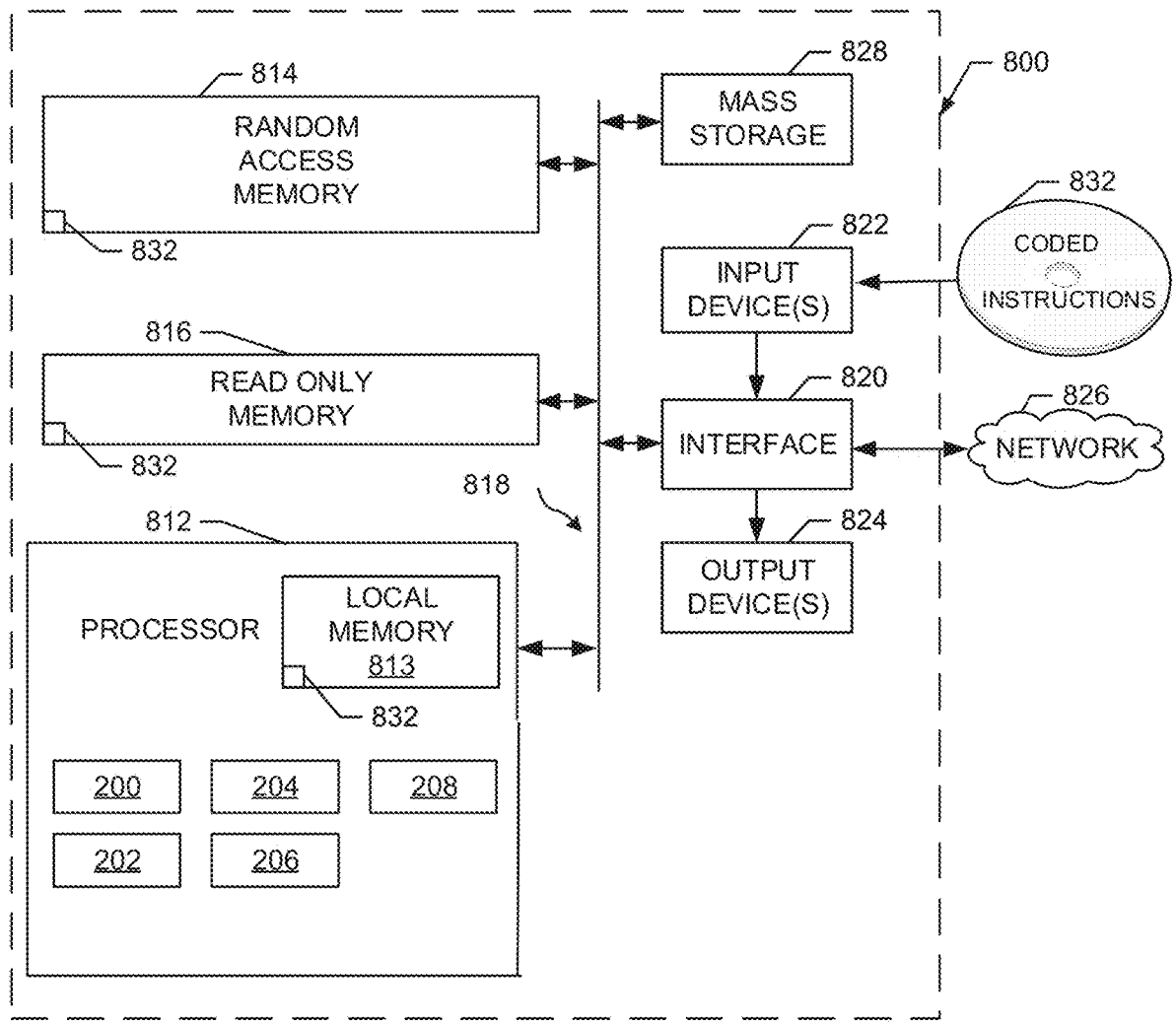
FIG. 8 is a block diagram of an example processing platform structured to execute the instructions of FIG. 4 to implement the example deepfake analyzer of FIGS. 1 and/or 2.

FIG. 8 is a block diagram of an example processor platform 800 structured to execute the instructions of FIGS. 4-5 to implement the deepfake analyzer 110 of FIG. 2. The processor platform 800 can be, for example, a server, a personal computer, a workstation, a web plugin tool, a self-learning machine (e.g., a neural network), a mobile device (e.g., a cell phone, a smart phone, a tablet such as an iPad™), an Internet appliance, or any other type of computing device.

The processor platform 800 of the illustrated example includes a processor 812. The processor 812 of the illustrated example is hardware. For example, the processor 812 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example network interface 200, the example component interface 202, the example deepfake classification model 204, the example explainability map generator 206, and/or the example report generator 208.

The processor 812 of the illustrated example includes a local memory 813 (e.g., a cache). The processor 812 of the illustrated example is in communication with a main memory including a volatile memory 814 and a non-volatile memory 816 via a bus 818. The volatile memory 814 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 816 may be implemented by flash memory and/or any other desired type of memory device. Access to the main memory 814, 816 is controlled by a memory controller.

The processor platform 800 of the illustrated example also includes an interface circuit 820. The interface circuit 820 may be implemented by any type of interface standard, such as an Ethernet interface, a universal serial bus (USB), a Bluetooth® interface, a near field communication (NFC) interface, and/or a PCI express interface.

In the illustrated example, one or more input devices 822 are connected to the interface circuit 820. The input device(s) 822 permit(s) a user to enter data and/or commands into the processor 812. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 824 are also connected to the interface circuit 820 of the illustrated example. The output devices 824 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 820 of the illustrated example, thus, typically includes a graphics driver card, a graphics driver chip and/or a graphics driver processor.

The interface circuit 820 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 826. The communication can be via, for example, an Ethernet connection, a digital subscriber line (DSL) connection, a telephone line connection, a coaxial cable system, a satellite system, a line-of-site wireless system, a cellular telephone system, etc.

The processor platform 800 of the illustrated example also includes one or more mass storage devices 828 for storing software and/or data. Examples of such mass storage devices 828 include floppy disk drives, hard drive disks, compact disk drives, Blu-ray disk drives, redundant array of independent disks (RAID) systems, and digital versatile disk (DVD) drives.

The machine executable instructions 832 of FIGS. 4-5 may be stored in the mass storage device 828, in the volatile memory 814, in the non-volatile memory 816, and/or on a removable non-transitory computer readable storage medium such as a CD or DVD.

Figure 9:
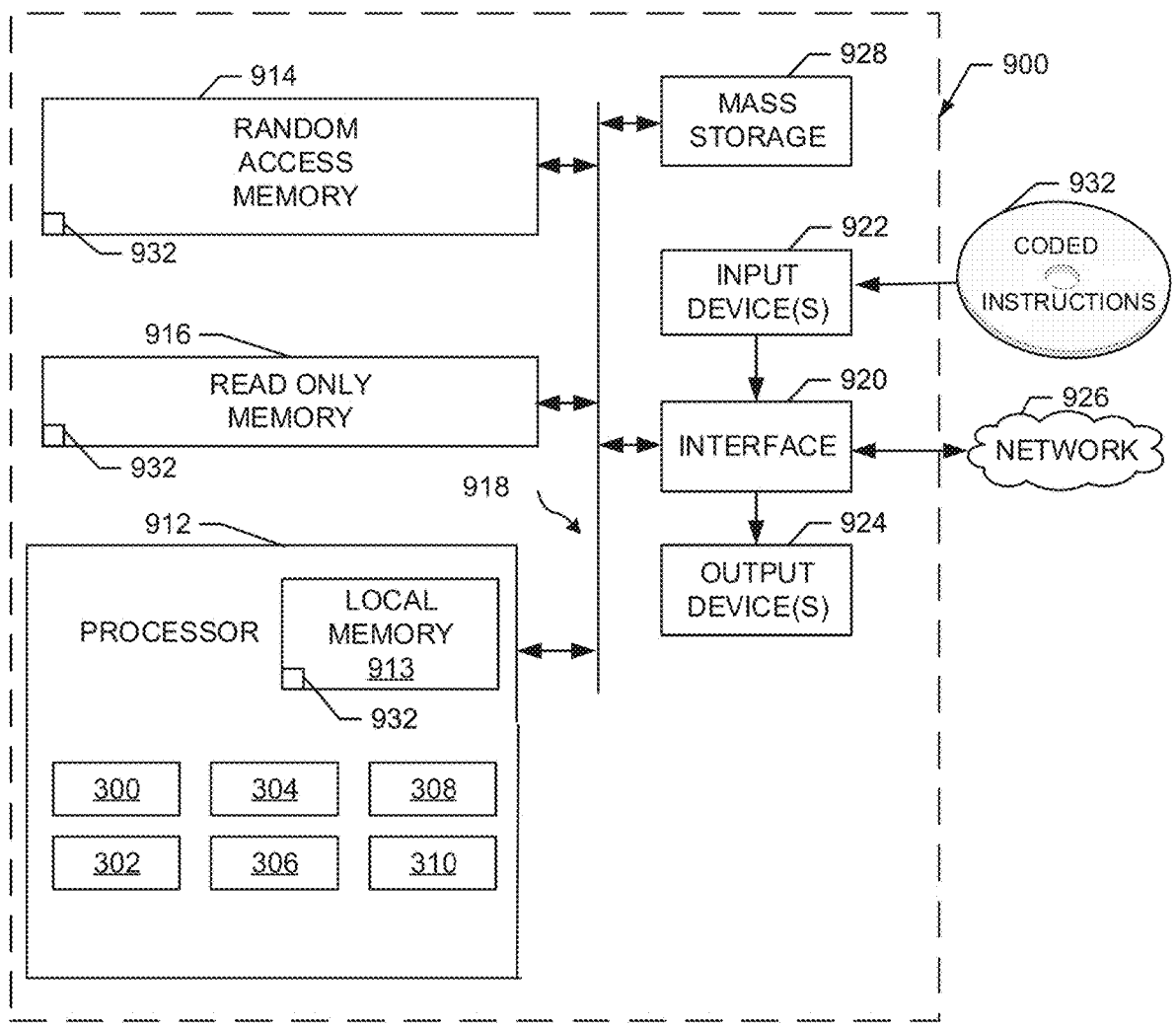
FIG. 9 is a block diagram of an example processing platform structured to execute the instructions of FIGS. 5-6 to implement the example artificial intelligence trainer of FIGS. 1 and/or 3.

FIG. 9 is a block diagram of an example processor platform 900 structured to execute the instructions of FIG. 6 to implement the AI trainer 104 of FIG. 3. The processor platform 900 can be, for example, a server, a personal computer, a workstation, a self-learning machine (e.g., a neural network), a mobile device (e.g., a cell phone, a smart phone, a tablet such as an iPad™), an Internet appliance, or any other type of computing device.

The processor platform 900 of the illustrated example includes a processor 912. The processor 912 of the illustrated example is hardware. For example, the processor 912 can be implemented by one or more integrated circuits, logic circuits, microprocessors, GPUs, DSPs, or controllers from any desired family or manufacturer. The hardware processor may be a semiconductor based (e.g., silicon based) device. In this example, the processor implements the example deepfake classification model trainer 300, the example classification analyzer 302, the example model modifier 304, the example network interface 306, the example component interface 308, and/or the example user interface 310

The processor 912 of the illustrated example includes a local memory 913 (e.g., a cache). The processor 912 of the illustrated example is in communication with a main memory including a volatile memory 914 and a non-volatile memory 916 via a bus 918. The volatile memory 914 may be implemented by Synchronous Dynamic Random Access Memory (SDRAM), Dynamic Random Access Memory (DRAM), RAMBUS® Dynamic Random Access Memory (RDRAM®) and/or any other type of random access memory device. The non-volatile memory 916 may be implemented by flash memory and/or any other desired type of memory device. Access to the main memory 914, 916 is controlled by a memory controller.

The processor platform 900 of the illustrated example also includes an interface circuit 920. The interface circuit 920 may be implemented by any type of interface standard, such as an Ethernet interface, a universal serial bus (USB), a Bluetooth® interface, a near field communication (NFC) interface, and/or a PCI express interface.

In the illustrated example, one or more input devices 922 are connected to the interface circuit 920. The input device(s) 922 permit(s) a user to enter data and/or commands into the processor 912. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 924 are also connected to the interface circuit 920 of the illustrated example. The output devices 924 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 920 of the illustrated example, thus, typically includes a graphics driver card, a graphics driver chip and/or a graphics driver processor.

The interface circuit 920 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 926. The communication can be via, for example, an Ethernet connection, a digital subscriber line (DSL) connection, a telephone line connection, a coaxial cable system, a satellite system, a line-of-site wireless system, a cellular telephone system, etc.

The processor platform 900 of the illustrated example also includes one or more mass storage devices 928 for storing software and/or data. Examples of such mass storage devices 928 include floppy disk drives, hard drive disks, compact disk drives, Blu-ray disk drives, redundant array of independent disks (RAID) systems, and digital versatile disk (DVD) drives.

The machine executable instructions 932 of FIG. 6 may be stored in the mass storage device 928, in the volatile memory 914, in the non-volatile memory 916, and/or on a removable non-transitory computer readable storage medium such as a CD or DVD.

From the foregoing, it will be appreciated that example methods, apparatus and articles of manufacture have been disclosed that improve deepfake detection with explainability. The disclosed methods, apparatus and articles of manufacture improve the efficiency of using a computing device to detect deepfakes by utilizing explainability to help better understand why misclassifications occur and adjust AI based on the explainability. In this manner, the accuracy of deepfake classification models are increased to be able to more accurately determine if the media file is or is not deepfake. Additionally, using examples disclosed herein, the trust in classifier predictions is improved. The disclosed methods, apparatus and articles of manufacture are accordingly directed to one or more improvement(s) in the functioning of a computer.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a deepfake classification model trainer to train a classification model based on a first portion of a dataset of media files with known classification information, the classification model to output a classification for input media file from a second portion of the dataset of media files with the known classification information;
a classification analyzer to:
compare the classification of the input media file from the classification model with a known classification of the input media file to determine if a misclassification occurred; and
when the input media file is misclassified, determine a reason for the misclassification based on a comparison of first patterns of an explainability map of the misclassified input media file to second patterns of correctly classified explainability maps, the explainability map to identify a part within the input media file responsible for generating the classification of the input media file;
a model modifier to modify the classification model based on the reason for the misclassification; and
an explainability map generator to:
calculate an average gradient value;
weigh a channel of a feature map using the average gradient value; and
generate the explainability map based on the average weighted feature map along channel dimensions of the feature map.

2. The apparatus of claim 1, wherein the classification analyzer is to determine that the misclassification occurred when the classification of the input media file from the classification model is different from the known classification of the input media file.

3. The apparatus of claim 1, wherein the classification analyzer is to further determine the reason for the misclassification by transmitting a prompt to a user to identify the reason, a response to the prompt corresponding to the reason for the misclassification.

4. The apparatus of claim 1, wherein the classification model is a neural network.

5. A non-transitory computer readable storage medium comprising instructions to cause at least one programmable circuit to at least:
train a classification model based on a first portion of a dataset of media files with known classification information, the classification model to output a classification for input media file from a second portion of the dataset of media files with the known classification information;
compare the classification of the input media file from the classification model with a known classification of the input media file to determine if a misclassification occurred;
when the input media file is misclassified, determine a reason for the misclassification based on a comparison of first patterns of an explainability map of the misclassified input media file to second patterns of correctly classified explainability maps, the explainability map to identify a part within the input media file responsible for generating the classification of the input media file;
modify the classification model based on the comparison of the first patterns to the second patterns; and
generate the explainability map based on an average weighted feature map along channel dimensions of a feature map.

6. The computer readable storage medium of claim 5, wherein the instructions are to cause one or more of the at least one programmable circuit to determine that the misclassification occurred when the classification of the input media file from the classification model is different from the known classification of the input media file.

7. The computer readable storage medium of claim 5, wherein the instructions are to cause one or more of the at least one programmable circuit to further determine the reason for the misclassification by transmitting a prompt to a user to identify the reason, a response to the prompt corresponding to the reason for the misclassification.

8. The computer readable storage medium of claim 5, wherein the classification model is a neural network.

9. A method comprising:
training, by executing an instruction with programmable circuitry, a classification model based on a first portion of a dataset of media files with known classification information, the classification model to output a classification for input media file from a second portion of the dataset of media files with the known classification information;
comparing, by executing an instruction with the programmable circuitry, the classification of the input media file from the classification model with a known classification of the input media file to determine if a misclassification occurred;
when the input media file is misclassified, determining, by executing an instruction with the programmable circuitry, a reason for the misclassification based on a comparison of first patterns of an explainability map of the misclassified input media file to second patterns of correctly classified explainability maps, the explainability map to identify a part within the input media file responsible for generating the classification of the input media file;
modifying, by executing an instruction with the programmable circuitry, the classification model based on the comparison of the first patterns to the second patterns; and
calculating, by executing an instruction with the programmable circuitry, an average gradient value, the average gradient value used to weigh a channel of a feature map to generate the explainability map.

10. The method of claim 9, further including determining that the misclassification occurred when the classification of the input media file from the classification model is different from the known classification of the input media file.

11. The method of claim 9, wherein the determining of the reason for the misclassification further includes transmitting a prompt to a user to identify the reason, a response to the prompt corresponding to the reason for the misclassification.

12. The method of claim 9, wherein the classification model is a neural network.

13. An apparatus comprising:
interface circuitry;
instructions; and
at least one programmable circuit to be programmed by the instructions to:
train a classification model based on a first portion of a dataset of media files with known classification information, the classification model to output a classification for input media file from a second portion of the dataset of media files with the known classification information;
compare the classification of the input media file from the classification model with a known classification of the input media file to determine if a misclassification occurred;
when the input media file is misclassified, determine a reason for the misclassification based on a comparison of first patterns of an explainability map of the misclassified input media file to second patterns of correctly classified explainability maps, the explainability map to identify a part within the input media file responsible for generating the classification of the input media file;
modify the classification model based on the reason for the misclassification; and
generate the explainability map based on an average weighted feature map along channel dimensions of the feature map.

14. The apparatus of claim 13, wherein one or more of the at least one programmable circuit is to determine that the misclassification occurred when the classification of the input media file from the classification model is different from the known classification of the input media file.

15. The apparatus of claim 13, wherein one or more of the at least one programmable circuit is to further determine the reason for the misclassification by transmitting a prompt to a user to identify the reason, a response to the prompt corresponding to the reason for the misclassification.

16. The apparatus of claim 13, wherein the classification model is a neural network.

\* \* \* \* \*